United States Patent [19]

Heitzmann et al.

[11] Patent Number: 4,842,649
[45] Date of Patent: Jun. 27, 1989

[54] CEMENT COMPOSITION CURABLE AT LOW TEMPERATURES

[75] Inventors: Richard F. Heitzmann, Pearland; Billy B. Gravitt, Katy; James L. Sawyer, Friendswood, all of Tex.

[73] Assignee: Pyrament, Inc., Houston, Tex.

[21] Appl. No.: 103,755

[22] Filed: Oct. 2, 1987

[51] Int. Cl.⁴ .............................................. C04B 22/10
[52] U.S. Cl. ........................................ 106/89; 106/97; 106/315; 106/DIG. 1
[58] Field of Search .................... 106/89, 97, DIG. 1, 106/315

[56] References Cited

U.S. PATENT DOCUMENTS

| | | | |
|---|---|---|---|
| 4,306,912 | 12/1981 | Forss | 106/315 |
| 4,514,228 | 4/1985 | Gouvenot | 106/98 |
| 4,640,715 | 2/1987 | Heitzmann et al. | 106/89 |
| 4,642,137 | 2/1987 | Heitzmann et al. | 106/89 |

FOREIGN PATENT DOCUMENTS

| | | | |
|---|---|---|---|
| 648626 | 9/1962 | Canada | 106/97 |
| 61-155239 | 7/1986 | Japan | 106/89 |
| 503831 | 3/1976 | U.S.S.R. | 106/97 |

*Primary Examiner*—William R. Dixon, Jr.
*Assistant Examiner*—David M. Brunsman
*Attorney, Agent, or Firm*—Darby & Darby

[57] ABSTRACT

A blended hydraulic cement composition, curable at low temperatures, including temperatures below the freezing point of water, is composed of portland cement, slag, pozzolans including metakaolin, and admixtures including potassium carbonate and water reducing compositions. The cement is particularly useful in producing concrete compositions which achieve high strength in a brief period of time, and continue curing at ambient temperatures, and temperatures below the freezing point of water.

16 Claims, No Drawings

CEMENT COMPOSITION CURABLE AT LOW TEMPERATURES

BACKGROUND OF THE INVENTION

Blended hydraulic cements are well known for their use of materials, such as fly ash and other pozzolans, that can result in durable concrete and good ultimate strengths. Unfortunately, these blended cements of the prior art do not generally achieve usable strengths for a substantial period of time and, thus, construction schedules are delayed. In addition, most of these compositions are portland cement compositions where the recommended cure is at 60° to 80° F., and absolutely no cure is obtained below 35° F.

While the ability to construct structures using cement, such as roads, air fields, and the like, at low temperatures has long been sought, and is desirable, for structures of this type, repair at temperatures below 35°, and substantially below that, is absolutely essential in modern society. Prior cement compositions have not permitted this, and, thus, the search has continued. In addition to the ability to cure at these low temperatures, the rapid attainment of usable strength is essential.

BRIEF DESCRIPTION OF THE INVENTION

In accordance with the present invention, a blended hydraulic cement has been developed that provides high early strengths, high ultimate strengths, durability and continues to gain strength at temperatures below freezing.

This cement can be utilized for rapid concrete construction or repair for hot weather or cold weather concreting as well as concreting under less extreme conditions thus allowing all weather concreting. This cement can be used for precast and prestressed concrete with or without heat curing.

The composition of the present invention includes the following components:
From 50 parts to about 80 parts portland cement
From 13 parts to about 35 parts fly ash
From 0 parts to about 10 parts metakaolin
From 0 parts to about 6 parts slag
From 0 parts to 4 parts admixture
From 1 parts to about 5 parts potassium carbonate When the cement of the present invention is used in concrete or mortar, the resulting hardened material has sufficient strength so that it can be put in service a few hours after being placed. This strength can be obtained without heat curing and continues to increase even when the hardened material is below the freezing point of water.

While it is indicated that the amount of metakaolin in the composition can vary from 0 to 10 parts, and that the amount of potassium carbonate can be between 1 and 5 parts, in order to achieve the continuing cure at temperatures below the freezing point of water, there must be at least 4 parts of metakaolin present, or 2 parts of potassium carbonate, or a combination of the two to provide a total of 2 parts based upon the formula:

Parts=parts potassium carbonate+½(parts metakaolin)

While the cured concrete formed in accordance with the present composition is primarily intended for rapid repair or reconstruction, it is not so limited, and can be effectively used for new construction, as well. The composition can obtain a compressive strength within a month of 12,000 psi, or even more. Such compressive strengths are above the compressive strengths readily attainable with present portland cement compositions.

DESCRIPTION OF THE PREFERRED EMBODIMENTS

The blended hydraulic cement of the present invention has, as previously indicated, the following essential components:
From 50 parts to about 80 parts portland cement
From 13 parts to about 35 parts fly ash
From 0 parts to about 10 parts metakaolin
From 0 parts to about 6 parts slag
From 0 parts to 4 parts admixture
From 1 parts to about 5 parts potassium carbonate The portland cement which is employed in the composition can be any of the types set forth in ASTM C 150-85A, or any desired blend of these compositions. Preferably, the amount of portland cement employed is in the range of from 55 to 60 parts, by weight.

The amount of fly ash is, to some extent, dependent upon the amount of portland cement employed in the composition. Preferably, the amount of fly ash is between 20 and 30 parts, by weight. The total of portland cement, fly ash, and slag, is also interdependent, and, in general, the total of these three items should be between 83 and 91 parts, by weight. Further, as the amount of fly ash is decreased, it can be compensated for, in part, by increasing use of metakaolin.

The type of fly ash to be employed is that defined as either Class F or Class C in ASTM designation C618-85. The Class C fly ash is preferred, because of the increased calcium oxide content; however, the Class F fly ash can be used with higher amounts of portland cement and/or slag. Either type of fly ash imparts sulfate resistance to the blended cement.

The metakaolin ($Al_2O_3 \cdot SiO_2$) is obtained by dehydroxylating kaolinite by heating at temperatures above 50° C. until the characteristic crystal structure is destroyed. The optimum temperature range is 600° C. to 800° C. The metakaolin essentially meets the classification requirements for a Class N calcined natural pozzolan as described in ASTM C618-85. The preferred amount of metakaolin to be employed is between 4 and 6 parts, by weight, though lower amounts can be employed. However, as indicated above, the inclusion of metakaolin in the formulation is preferable where the utilization of the composition at temperatures below the freezing point of water is contemplated. When little, or no, metakaolin is present, there is less durability in the finished product in successive freeze/thaw cycles. When metakaolin in the range of 6 to 10% is employed, more water is required for curing the cement, and the cost of the composition is increased beyond a desirable amount.

The slag which is employed is a finely ground, granulated blast furnace slag as set forth for blended hydraulic cements in ASTM standard C595-86. Preferably, the amount of slag to be employed is between 4 and 5 parts, by weight. If desired, as indicated by the overall formulation, the slag component of the composition can be omitted completely. However, it does supply some glassy silicate components, as well as calcium compounds. Further, the use of slag does provide some sulfate resistance, but that resistance is also provided by fly ash.

While a variety of materials could be employed as the admixtures to be used in this composition, the preferred materials are citric acid and a material sold as Cormix 2000. When these are employed, the citric acid is preferably used in amounts of up to 3 parts and the Cormix in in amounts of up to 1 part, preferably 0.5 to 1.5 parts by weight citric acid and 0.15 to 0.40 part by weight Cormix 2000.

The citric acid can be used in any of its available grades, including fine crystal, liquid, or powder. Additionally, salts of citric acid can be used in place of the citric acid, itself. The material is a known retarder for aluminate phases in portland cement, calcium fluoroaluminate, and calcium aluminate cements. In the composition of the present invention, it functions as a retarder for the hydration reactions and, at the same time, reduces the water requirement and shortens mixing time. Because of the relatively high cost of the material, the minimum required should be used. However its total elimination results in less workability and lower strengths. While, as indicated, salts of the citric acid, such as potassium and sodium citrate can be employed, the use of too great an amount of these materials results in a composition which will not harden. The citric acid also reduces the mixing time required to achieve fluidity.

The reason for desiring less water is that greater strength in the final concrete is obtained at a given plasticity. Further, use of less water provides improved permeability and strength in the final composition. The citric acid can be employed in conjunction with other retarders and, under those circumstances, the amount of citric acid would be less in the overall composition.

The Cormix 2000 is the sodium salt of a copolymer of an unsaturated carboxylic acid and the hydroxyalkyl ester of that acid. The material meets the requirements of ASTM C494-86, as a type G admixture, one which is water-reducing, high range, and retarding. As with the citric acid, the Cormix 2000 reduces the amount of water required to give a workable mix, therefore increasing the strength and cold weather performance of the final concrete. While the Cormix has been found to be effective, it could be replaced with many other admixtures which are also high range, water reducers. However, there is a cost effectiveness factor which must be considered.

An essential component of the cement composition of the present invention is potassium carbonate. Preferably, it is used as a fine powder and all, or part of it, can be replaced with sodium carbonate. Additionally, kiln dust could be used in place of the potassium carbonate, but it provides problems in that it also contains potassium sulfate and calcium carbonate. While the use of potassium carbonate as an accelerator has previously been disclosed, it has not been used with the components of the present invention to provide the particularly surprising properties accomplished. While it is possible to substitute alkali hydroxides for the potassium carbonate, the composition does not perform as well in low temperature curing. Up to one-third of the potassium carbonate can be replaced with alkali metal hydroxides. When using alkali hydroxides, there are also greater storage problems.

The potassium carbonate, which is preferably used in an amount of from 2 to 4 parts, by weight, accelerates the pozzolanic reactions between hydroxides and siliceous or siliceous-aluminous materials. It is particularly effective for this purpose, both at ambient temperatures and at temperatures below the freezing point of water. When employed in higher amounts, higher early strengths are obtained, but there is less working time available for placement of the concrete.

The order of mixing the various materials which make up the composition of the present invention is immaterial. All of the components can be interground or interblended, and used as a complete cement formulation. If desired, some or all of the pozzolan materials can be added at the concrete mixer, and the functional additions added in a water solution at the concrete mixer.

Employing the formulations of the present invention, as previously indicated, contrary to the prior art, cures can be effected at temperatures well below the freezing point of water and, in fact, cure can be accomplished at temperatures as low as $-16°$ F. Even at these low temperatures, substantial strengths are obtained, so that repair work is possible, particularly on roads and airports, even during winter months, something which cannot be accomplished with portland cement.

The following are given as examples of the formulations of the cement of the present invention. They should be considered only as illustrative and not as limiting, in any way, the full scope of the invention as covered in the appended claims of the invention. All parts are by weight.

Examples

EXAMPLE 1

A binder was prepared consisting of:
58.20 parts portland cement
28.77 parts Class C fly ash
4.41 parts metakaolin
4.82 parts slag
1.18 parts citric acid
0.35 part Cormix 2000
2.27 parts potassium carbonate

EXAMPLE 2

A concrete was prepared employing the binder of Example 1 and other necessary materials as indicated below:
747.4 parts of Binder of Example 1
1148 parts sand
1722 parts gravel
175 parts water
The various materials were mixed in a concrete mixer. The resulting concrete had a slump of 0 inches and remained workable for 105 minutes. The concrete was cast in molds and cured at ambient temperatures (73° F.). This concrete had compressive strengths of 4,000 psi at 4 hours, 5,800 psi at 1 day, 10,000 psi at 7 days, and 12,000 psi at 28 days.

EXAMPLE 3

This was the same as Example 2, except that 185 parts of water were used. This concrete had the following properties: 2½ inch slump, 90 minutes workability, compressive strengths of 3,200 psi at 4 hours, 5,100 psi at 1 day, 9,600 psi at 7 days, and 12,500 psi at 28 days.

EXAMPLE 4

The same concrete as in Example 3 when mixed and cast in molds at ambient temperatures (73° F.), and then cooled to 6°±2° F., when brought to ambient temperature, just prior to testing had compressive strengths of 2,200 psi at 4 hours, 3,400 psi at 1 day, and 4,100 psi at 7 days. In this, and subsequent examples when the material was first cooled to 6°±2° F., and then brought to ambient temperature, sufficient were made for each of the tests. Each sample was allowed to warm to ambient temperature for its test, only.

EXAMPLE 5

This was the same as Example 2, except that 195 parts of water were used. This concrete had the following properties: 6 inch slump, 80 minutes workability, compressive strengths of 2,700 psi at 4 hours, 4,500 psi at 1 day, 9,000 psi at 7 days and 10,800 psi at 28 days.

EXAMPLE 6

A binder was prepared similar to Example 1, except that 2.54 parts of potassium carbonate were used instead of 2.27 parts of potassium carbonate.

EXAMPLE 7

A concrete was prepared employing the binder of Example 6 and other necessary materials as indicated below:
749.4 parts of Binder of Example 6
1148 parts sand
1722 parts gravel
175 parts water
This concrete had the following properties: 0 inch slump, 75 minutes workability, compressive strengths of 4,000 psi at 4 hours, 6,000 psi at 1 day, 10,000 psi at 7 days, and 12,000 psi at 28 days.

EXAMPLE 8

This was the same as Example 7, except that 185 parts of water were used. This concrete had the following properties: ¼ inch slump, 75 minutes workability, compressive strengths of 3,500 psi at 4 hours, 5,600 psi at 1 day, 9,800 psi at 7 days, and 11,900 psi at 28 days.

EXAMPLE 9

The same concrete as in Example 8 when mixed and cast in molds at ambient temperatures (73° F.), and immediately cooled to 6°±2° F., and warmed to ambient just prior to testing had compressive strengths of 2,900 psi at 4 hours, 3,500 psi at 1 day, and 4,200 psi at 7 days.

EXAMPLE 10

This was the same as Example 7, except that 195 parts of water were used. This concrete had the following properties: 6 inch slump, 90 minutes workability, compressive strengths of 2,800 psi at 4 hours, 4,600 psi at 1 day, 9,200 psi at 7 days, and 11,100 psi at 28 days.

EXAMPLE 11

A binder was prepared similar to Example 1, except that 2.79 parts of potassium carbonate were used instead of 2.27 parts of potassium carbonate.

EXAMPLE 12

A concrete was prepared employing the binder of Example 11 and other necessary materials as indicated below:
751.4 parts of Binder of Example 11
1148 parts sand
1722 parts gravel
175 parts water
This concrete had the following properties: 0 inch slump, 65 minutes workability, compressive strengths of 4,200 psi at 4 hours, 6,200 psi at 1 day, 10,600 psi at 7 days, and 12,000 psi at 28 days.

EXAMPLE 13

This was the same as Example 12, except that 185 parts of water used. This concrete had the following properties: 1½ inch slump, 60 minutes workability, compressive strengths of 3,700 psi at 4 hours, 5,900 psi at 1 day, 9,800 psi at 7 days, and 11,500 psi at 28 days.

EXAMPLE 14

The same concrete as in Example 13, when mixed and cast in molds at ambient temperatures (73° F.) and immediately cooled to 6°±2° F., and warmed to ambient just prior to testing had compressive strengths of 3,200 psi at 4 hours, 3,600 psi at 1 day, and 4,300 psi at 7 days.

EXAMPLE 15

This was the same as Example 12, except that 195 parts of water were used. This concrete had the following properties: 4 inch slump, 80 minutes workability, compressive strengths of 2,800 psi at 4 hours, 4,800 psi at 1 day, 9,500 psi at 7 days, and 11,200 psi at 28 days.

EXAMPLE 16

A binder was prepared similar to Example 1, except that 3.05 parts of potassium carbonate were used instead of 2.27 parts of potassium carbonate.

EXAMPLE 17

A concrete was prepared employing the binder of Example 16 and other necessary materials as indicated below:
753.4 parts Binder of Example 16
1148 parts sand
1722 parts gravel
175 parts water
This concrete had the following properties: 0 inch slump, 35 minutes workability, compressive strengths of 4,200 psi at 4 hours, 6,500 psi at 1 day, 10,700 psi at 7 days, and 12,400 psi at 28 days.

EXAMPLE 18

This was the same as Example 17, except that 185 parts of water were used. This concrete had the following properties: ¾ inch slump, 45 minutes workability, compressive strengths of 3,900 psi at 4 hours, 6,200 psi at 1 day, 9,800 psi at 7 days, and 12,200 psi at 28 days.

EXAMPLE 19

The same concrete as in Example 18, when mixed and cast in molds at ambient temperatures (73° F.) and immediately cooled to 6°±2° F. and warmed to ambient temperature just prior to testing, had compressive strengths of 3,400 psi at 4 hours, 3,600 psi at 1 day, and 4,300 psi at 7 days.

EXAMPLE 20

This was the same as Example 17, except that 195 parts of water were used. This concrete had the following properties: 2½ inch slump, 55 minutes workability, compressive strengths of 3,000 psi at 4 hours, 5,600 psi at 1 day, 9,800 psi at 7 days, and 12,000 psi at 28 days.

EXAMPLE 21

A binder was prepared consisting of:
58.16 parts portland cement 29.21 parts Class C fly ash
4.54 parts metakaolin
4.80 parts slag
0.93 part citric acid
0.17 part Cormix 2000
0.19 part borax
2.00 parts potassium carbonate

EXAMPLE 22

A concrete was prepared employing the binder of Example 21 and other necessary materials as indicated below:
749.7 parts Binder of Example 21
2870 parts sand and gravel
200 parts water
The various materials were mixed in a concrete mixer. The resulting concrete remained workable for 80 minutes. The concrete was mixed, cast in molds and cured at ambient temperatures 73° F.). This concrete had compressive strengths of 3,100 psi at 4 hours, 5,200 psi at 1 day, and 10,600 psi at 3 days.

EXAMPLE 23

A binder was prepared consisting of:
57.28 parts portland cement
29.31 parts Class C fly ash
4.95 parts metakaolin
5.35 parts slag
0.67 part citric acid
0.20 part Cormix 2000
0.23 part borax
2.01 parts potassium carbonate

EXAMPLE 24

A concrete was prepared employing the binder of Example 23 and other necessary materials as indicated below:
747.2 parts Binder of Example 23
2870 parts sand and gravel
200 parts water
The various materials were mixed in a concrete mixer. The resulting concrete remained workable for 115 minutes. The concrete was mixed, cast in molds, and cured at ambient temperatures (73° F.). This concrete had compressive strengths of 2,700 psi at 4 hours, 5,100 psi at 1 day, and 10,200 psi at 3 days.

EXAMPLE 25

A binder was prepared consisting of:
58.05 parts portland cement
24.02 parts Class C fly ash
4.40 parts metakaolin
4.80 parts slag
1.17 parts citric acid
0.35 part Cormix 2000
2.54 parts potassium carbonate
4.67 parts kiln dust

EXAMPLE 26

A concrete was prepared employing the binder of Example 25 and other necessary materials as indicated below:
749.4 parts Binder of Example 25
1148 parts sand
1722 parts gravel
180 parts water
The various materials were mixed in a concrete mixer. The concrete was mixed, cast in molds and cured at ambient temperatures (73° F.). This concrete had compressive strengths of 2,300 psi at 2 hours, 3,300 psi at 3 hours, and 3,800 psi at 4 hours.

EXAMPLE 27

A binder was prepared consisting of:
56.52 parts portland cement
29.06 parts Class C fly ash
4.93 parts metakaolin
5.33 parts slag
1.20 parts citric acid
0.20 part Cormix 2000
0.23 part borax
0.93 part potassium hydroxide
1.60 parts potassium carbonate

EXAMPLE 28

A concrete was prepared using the binder of Example 27 and other necessary materials as indicated below:
750.2 parts Binder of Example 27
2870 parts sand and gravel
183 parts water
The various materials were mixed in a concrete mixer. The resulting concrete remained workable for 70 minutes. The concrete was mixed, cast in molds, and cured at ambient temperatures (73° F.). This concrete had compressive strengths of 4,000 psi at 4 hours, and 5,600 psi at 1 day.

EXAMPLE 29

A binder was prepared similar to Example 1, except that a Class F fly ash was used instead of Class C fly ash, and 3.34 parts of potassium carbonate were used instead of 2.27 parts of potassium carbonate.

EXAMPLE 30

A concrete was prepared employing the binder of Example 29 and other necessary materials as indicated below:
755.4 parts of Binder of Example 29
2870 parts sand and gravel
188 parts water
The various materials were mixed in a concrete mixer. The resulting concrete had a slump of 1 inch. The concrete was cast in molds and cured at ambient temperatures (73° F.). This concrete had compressive strengths of 2,300 psi at 4 hours, 4,500 psi at 1 day, 9,600 psi at 7 days, and 12,000 psi at 28 days.

EXAMPLE 31

The same concrete as in Example 30 when mixed and cast in molds at ambient temperatures (73° F.) and immediately cooled at 6°±2° F. and then warmed to ambient temperature just prior to testing, had compressive strengths of 1,700 psi at 4 hours, 2,600 psi at 1 day, 4,000 psi at 7 days, and 5,800 psi at 28 days.

EXAMPLE 32

A binder was prepared consisting of:
58.54 parts portland cement
28.52 parts Class C fly ash
4.46 parts metakaolin
4.80 parts slag
0.83 part citric acid
0.16 part Cormix 2000
0.21 part WRDA 79
2.48 parts potassium carbonate WRDA 79 is a modified lignosulfate, with catalyst, meeting the requirements of ASTM C494-86 as a Type A admixture and Type D admixture.

EXAMPLE 33

A concrete was prepared employing the binder of Example 32 and other necessary materials as indicated below:
605 parts Binder of Example 32
1300 parts sand
1817 parts gravel
155 parts water
The various materials were mixed in a concrete mixer. The concrete was mixed, cast in molds and cured at ambient temperature (73° F.). This concrete had compressive strengths of 2,200 psi at 4 hours, 5,300 psi at 1 day, 11,400 psi at 7 days, and 12,000 psi at 28 days.

EXAMPLE 34

The same concrete as in Example 33 when mixed and cast in molds at ambient temperatures (73° F.) and immediately cooled to 6°±2° F. and warmed to ambient temperature just prior to testing had compressive strengths of 900 psi at 4 hours, 3,300 psi at 1 day, 3,900 psi at 7 days, and 6,300 psi at 28 days.

EXAMPLE 35

A mortar was prepared employing the binder of Example 11 and other necessary materials as indicated below:
752 parts of Binder of Example 11
1200 parts sand
176 parts water
The various materials were mixed in a mortar mixer. The mortar was mixed and cast in molds at ambient temperature (73° F.). One third of the specimens were stored in ambient air (73° F.) and this mortar had compressive strengths of 13,000 psi at 7 days, 14,700 psi at 22 days, and 14,900 psi at 29 days.

One third of the specimens were immediately cooled to 6°±2° F. and subjected to repeated heatings to ambient temperature and cooling to 6°±2° F., in air. This mortar had compressive strengths of 9,500 psi after ten cycles of cooling and heating (7 days age), 12,800 psi after 15 cycles (22 days age), and 13,800 psi after 20 cycles (29 days age).

One third of the specimens were immediately cooled to 6°±2° F. and subjected to heating and cooling, in water. This mortar had compressive strengths of 8,800 psi after ten cycles of heating and cooling (7 days age), 9,700 psi after 15 cycles (22 days age), and 11,200 psi after 20 cycles (29 days age).

EXAMPLE 36

A binder was prepared consisting of:
56.90 parts portland cement
29.25 parts Class C fly ash
4.96 parts metakaolin
5.37 parts slag
1.21 parts citric acid
0.20 part Cormix 2000
0.23 part borax
1.88 parts potassium carbonate

EXAMPLE 37

A mortar was prepared employing the binder of Example 36 and other necessary materials as indicated below:
745 parts of Binder of Example 36
1200 parts sand
190 parts water
The various materials were mixed in a mortar mixer. The mortar was mixed and cast in molds at ambient temperatures (73° F.). This mortar when cured at ambient temperatures (73° F.) had compressive strengths of 3,100 psi at 2 hours, 4,300 psi at 3 hours, 4,700 psi at 4 hours, 6,500 psi at 1 day, and 12,000 psi at 7 days.

EXAMPLE 38

A binder was prepared, similar to Example 36, except that 2.15 parts of potassium carbonate were used instead of 1.88 parts of potassium carbonate.

EXAMPLE 39

A mortar was prepared, similar to Example 37, except that the binder of Example 38 was employed. This mortar was cured at ambient temperatures (73° F.). This mortar had compressive strengths of 4,000 psi at 2 hours, 4,400 psi at 3 hours, and 4,800 psi at 4 hours. With steam curing (190° F.), the compressive strength was 7,300 psi at 4 hours.

EXAMPLE 40

A binder was prepared consisting of:
57.43 parts portland cement
28.98 parts Class C fly ash
4.39 parts metakaolin
4.78 parts slag
1.20 parts citric acid
0.20 part Cormix 2000
0.22 part borax
1.20 parts potassium hydroxide
1.60 parts potassium carbonate

EXAMPLE 41

A mortar was prepared employing the binder of Example 40 and other necessary materials as indicated below:
752 parts Binder of Example 40
1200 parts sand
170 parts water
The various materials were mixed in a mortar mixer. The mortar was mixed and cast in molds at ambient temperatures (73° F.). This mortar when cured at ambient temperatures had compressive strengths of 3,300 psi at 2 hours, 4,300 psi at 3 hours, and 4,500 psi at 4 hours.

EXAMPLE 42

A binder was prepared consisting of:
58.05 parts portland cement
28.69 parts Class C fly ash
4.40 parts metakaolin
4.80 parts slag
1.17 parts citric acid
0.35 part Cormix 2000
2.54 parts potassium carbonate

EXAMPLE 43

A concrete was prepared employing the binder of Example 42 and other necessary materials as indicated below:
749.4 parts Binder of Example 42
1290 parts sand
1580 parts gravel
190 parts water The portland cement, 96% of the fly ash, metakaolin, and slag were preblended and added as a dry component to the concrete mixer. The remaining 4% of the fly ash, the citric acid, Cormix, and potassium carbonate were preblended and added separately as a second dry component. The resulting concrete remained workable for 140 minutes. The concrete was cast in molds and cured at ambient temperatures (73° F.). The concrete had compressive strengths of 2,900 psi at 4 hours, 5,200 psi at 1 day, 9,700 psi at 7 days, and 11,400 psi at 28 days.

EXAMPLE 44

A binder was prepared consisting of:
55.97 parts portland cement
27.66 parts Class C fly ash
4.25 parts metakaolin
4.63 parts slag
2.26 parts citric acid
0.34 part Cormix 2000
4.89 parts potassium carbonate

EXAMPLE 45

A concrete was prepared employing the binder of Example 44 and other necessary materials as indicated below:
777.2 parts Binder of Example 44
1148 parts sand
1722 parts gravel
175 parts water The portland cement, fly ash, metakaolin, and slag were preblended and added as a dry cement to the concrete mixer. The citric acid, Cormix, and potassium carbonate were added as liquid admixtures which were added at the mixer. The resulting concrete remained workable for 135 minutes. The concrete was cast in molds and cured at ambient temperatures (73° F.). The concrete had compressive strengths of 3,100 psi at 4 hours, 5,500 psi at 1 day, 10,000 psi at 7 days, and 12,000 psi at 28 days.

EXAMPLE 46

A mortar, as in Example 35, was prepared employing the binder of Example 11. The various materials were mixed without an air entraining agent in a mortar mixer. Suitable specimens were cast and subjected to 300 repeated cycles of heating and cooling, as previously defined, in water. The Durability Factor for this material was 96, according to ASTM C666-84 Method A.

EXAMPLE 47

A mortar, as in Example 46, was prepared and suitable specimens were cast and placed in a solution of sodium and magnesium sulfate, according to ASTM C1012-84. The average length change after 100 days of exposure to sulfate attack was 0.06% with no visible deterioration.

EXAMPLE 48

A binder was prepared consisting of:
61.39 parts portland cement
30.33 parts Class C fly ash
4.67 parts metakaolin
0.99 part citric acid
0.21 part Cormix 2000
2.41 parts sodium carbonate

EXAMPLE 49

A concrete was prepared employing the binder of Example 48 and other necessary materials as indicated below:
706 parts Binder of Example 48
1435 parts sand
1755 parts gravel
175 parts water The various materials were mixed in a concrete mixer. The concrete was cast in molds and cured at ambient temperatures (73° F.). This concrete had compressive strengths of 2,400 psi at 4 hours and 5,400 psi at 1 day.

EXAMPLE 50

A mortar was prepared employing the binder of Example 48 and, other necessary materials as indicated below:
709 parts Binder of Example 48
1236 parts sand
170 parts water The various materials were mixed in a mortar mixer. The mortar was mixed and cast in molds at ambient temperatures (73° F.). The specimens were stored in ambient air (73° F.) and this mortar had compressive strengths of 3,500 psi at 4 hours and 6,700 psi at 1 day.

In the examples above, Class C fly ash had the following analysis:
$SiO_2$: 37.60
$Al_2O_3$: 20.47
$Fe_2O_3$: 5.44
$CaO$: 21.54
$MgO$: 4.61
$SO_3$: 1.71
$Na_2O$: 2.78
$K_2O$: 0.52
$TiO_2$: 1.05
$SrO$: 0.65

Class F fly ash had the following analysis:
$SiO_2$: 51.31
$Al_2O_3$: 25.03
$Fe_2O_3$: 7.28
$CaO$: 6.93
$MgO$: 1.91
$SO_3$: 0.59
$Na_2O$: 0.42
$K_2O$: 3.15
$TiO_2$: 1.25
$SrO$: 0.16

The ground slag had the following analysis:
$SiO_2$: 34.48
$Al_2O_3$: 10.15
$Fe_2O_3$: 0.39
$CaO$: 36.44
$MgO$: 12.56
$SO_3$: 2.89
$Na_2O$: 0.17
$K_2O$: 0.31
$TiO_2$: 0.39
$SrO$: 0.04

Thus, in accordance with the present invention, a composition has been given for a blended hydraulic cement for varying uses. This cement can be used with aggregates to form a concrete or mortar with high early strength, suitable for use under various curing conditions, resulting in a hardened material that can be placed in service in a matter of a few hours with high ultimate strengths and with good durability under freeze-thaw and sulfate attack.

The invention should not be considered as limited to the specific examples shown, but only as set forth in the appended claims.

We claim:

1. A blended hydraulic cement composition, capable of curing at temperatures below freezing, consisting essentially of:
   From 50 parts to about 80 parts portland cement
   From 13 parts to about 35 parts fly ash
   From 0 parts to about 10 parts metakaolin
   From 0 parts to about 6 parts slag
   From 0 parts to 4 parts admixture, wherein said admixture is a set regulating additive,
   From 1 part to about 5 parts potassium carbonate, wherein the parts of potassium carbonate plus one-half of the parts of metakaolin is equal to at least 2.

2. The composition of claim 1 wherein the admixture is citric acid in an amount of from 0.5 to 1.5 parts, by weight.

3. The composition of claim 1 wherein the amount of the admixture is from about 0.15 to 0.40 part, by weight.

4. The composition of claim 1 wherein the amount of portland cement is from 55 to 60 parts, by weight.

5. The composition of claim 1 wherein the amount of fly ash is from about 20 to 30 parts, by weight.

6. The composition of claim 1 wherein the amount of metakaolin is from about 4 to 6 parts, by weight.

7. The composition of claim 1 wherein the amount of slag is from about 4 to 5 parts, by weight.

8. The composition of claim 1 wherein up to one-third of the potassium carbonate is replaced by an alkali metal hydroxide.

9. A blended hydraulic cement composition, capable of curing at temperatures below freezing, consisting essentially of:
   From 50 parts to about 80 parts portland cement
   From 13 parts to about 35 parts fly ash
   From 0 parts to about 10 parts metakaolin
   From 0 parts to about 6 parts slag
   From 0 parts to 4 parts admixture, wherein said admixture is a set regulating additive,
   From 1 part to about 5 parts sodium carbonate, wherein the parts of sodium carbonate plus one-half of the parts of metakaolin is equal to at least 2.

10. The composition of claim 9 wherein the admixture is citric acid in an amount of from 0.5 to 1.5 parts, by weight.

11. The composition of claim 9 wherein the amount of admixture, is from about 0.15 to 0.40 parts, by weight.

12. The composition of claim 9 wherein the amount of portland cement is from 55 to 60 parts, by weight.

13. The composition of claim 9 wherein the amount of fly ash is from about 20 to 30 parts, by weight.

14. The composition of claim 9 wherein the amount of metakaolin is from about 4 to 6 parts, by weight.

15. The composition of claim 9 wherein the amount of slag is from about 4 to 5 parts, by weight.

16. The composition of claim 9 wherein up to one-third of the sodium carbonate is replaced by an alkali metal hydroxide.

* * * * *